United States Patent
Hernandez Covarrubias et al.

(10) Patent No.: US 11,276,382 B2
(45) Date of Patent: Mar. 15, 2022

(54) SOUND ABSORBER FIXING POINT AND MOUNTING SYSTEM

(71) Applicant: GM Global Technology Operations LLC, Detroit, MI (US)

(72) Inventors: Alejandro Hernandez Covarrubias, Metepec (MX); Rafael Cuarenta Samano, Almoloya de Juarez (MX); Brando Cervantes Arroyo, Mexico City (MX)

(73) Assignee: GM Global Technology Operations LLC, Detroit, MI (US)

( * ) Notice: Subject to any disclaimer, the term of this patent is extended or adjusted under 35 U.S.C. 154(b) by 598 days.

(21) Appl. No.: 16/213,560

(22) Filed: Dec. 7, 2018

(65) Prior Publication Data
US 2020/0184940 A1 Jun. 11, 2020

(51) Int. Cl.
*G10K 11/162* (2006.01)
*B60R 13/08* (2006.01)

(52) U.S. Cl.
CPC .......... *G10K 11/162* (2013.01); *B60R 13/083* (2013.01)

(58) Field of Classification Search
CPC .............. G10K 11/162; B60R 13/083; B60R 2013/0807; B60R 13/08; B60R 13/04; F16B 37/0842
USPC ......................................................... 181/286
See application file for complete search history.

(56) References Cited

U.S. PATENT DOCUMENTS

| | | | | |
|---|---|---|---|---|
| 4,435,111 A | * | 3/1984 | Mizusawa | F16B 37/0842 411/21 |
| 5,707,192 A | * | 1/1998 | Vortriede | F16B 37/041 411/175 |
| 5,831,225 A | * | 11/1998 | Campbell | F16B 5/065 181/284 |
| 7,070,848 B2 | * | 7/2006 | Campbell | B60R 13/083 181/284 |
| 7,114,901 B2 | * | 10/2006 | Maruyama | F16B 5/0208 411/353 |
| 7,891,151 B2 | * | 2/2011 | Sano | B62D 29/048 52/506.05 |

(Continued)

FOREIGN PATENT DOCUMENTS

| | | | | |
|---|---|---|---|---|
| DE | 102009035785 A1 | * | 3/2010 | ......... B60R 13/0206 |
| FR | 3007087 A1 | * | 12/2014 | ............ F16B 21/086 |
| WO | 03020555 A1 | | 3/2003 | |

*Primary Examiner* — Forrest M Phillips
(74) *Attorney, Agent, or Firm* — Vivacqua Crane PLLC (57) ABSTRACT

A vehicle sound absorber system includes a sound absorber fixing fastener having a cap with a cylindrical bore and an end face including multiple flexible bite members. A sound absorber material body is locally compressed and partially captured within the cylindrical bore. A remainder of the sound absorber material body not captured within the cylindrical bore extends radially outward and freely away from the cap. A stud extending from a vehicle body wall extends through a through aperture created in the sound absorber material body and a sound absorber panel of an acoustic material mounted on the vehicle body wall. The cap is captured on the stud by frictional engagement of the flexible bite members on the stud. The sound absorbing material of the sound absorber material body replaces sound absorber material removed to form each of a recessed area and a fully compressed layer of the sound absorber panel.

20 Claims, 5 Drawing Sheets

(56) References Cited

U.S. PATENT DOCUMENTS

| | | | | |
|---|---|---|---|---|
| 7,963,363 | B2* | 6/2011 | Niwa | B60R 13/0838 |
| | | | | 181/290 |
| 8,701,825 | B2* | 4/2014 | Yamamoto | B60R 13/083 |
| | | | | 181/290 |
| 9,190,821 | B2* | 11/2015 | Kwasiborski | F16B 37/0842 |
| 9,651,083 | B2* | 5/2017 | Bizzini | F16B 43/00 |
| 9,746,018 | B2* | 8/2017 | Williams | F16B 37/041 |
| 10,974,665 | B2* | 4/2021 | Heiselbetz | F16B 5/0241 |
| 2005/0241118 | A1* | 11/2005 | Mizukoshi | F16B 5/065 |
| | | | | 24/297 |
| 2016/0355147 | A1* | 12/2016 | Zielinski | B60R 13/02 |
| 2018/0172057 | A1* | 6/2018 | Albach | F16B 37/16 |
| 2018/0361952 | A1* | 12/2018 | Petley | F02B 77/11 |
| 2019/0291312 | A1* | 9/2019 | Etterli | F16B 19/1081 |

\* cited by examiner

SOUND ABSORBER FIXING POINT AND MOUNTING SYSTEM

The present disclosure relates to acoustic insulation and fasteners used to attach acoustic insulation in automobile vehicles.

Acoustic material sound absorber panels are commonly installed on vehicle body panels or walls using studs fixed to the vehicle body wall and retention fasteners which engage the studs. Acoustic absorption capability is lost in the areas where the studs are located due to the compression of the acoustic material panel needed to avoid delamination in the areas of penetration by the studs used to mount the acoustic material panel. In addition, known fasteners used to mount sound absorber panels are difficult to remove and commonly generate damage of the acoustic material due to the additional tools necessary to be employed to remove the fasteners to permit maintenance in the local area or replacement of the sound absorber panels.

Thus, while current sound absorber panel installation methods and fasteners achieve their intended purpose, there is a need for a new and improved system and method for installing sound absorber panels in automobile vehicles.

SUMMARY

According to several aspects, a sound absorber fixing fastener includes a cap having a cylindrical-shape defining an outer perimeter wall and a cylindrical bore. A sound absorber material body is locally compressed and partially captured within the cylindrical bore of the cap. A remainder of the sound absorber material body not captured within the cylindrical bore extends radially outward and freely away from the cap.

In another aspect of the present disclosure, an end face of the cap defining a seating surface to directly contact a planar compressed portion of a sound absorber panel.

In another aspect of the present disclosure, the end face of the cap includes multiple flexible bite members.

In another aspect of the present disclosure, each of the bite members defines a propeller-shape.

In another aspect of the present disclosure, each of the bite members includes a curved end face shaped to substantially match a radius of curvature of an outer surface of a shank of a stud.

In another aspect of the present disclosure, a gap provided between each two successive ones of the bite members allows the individual bite members to individually elastically flex.

In another aspect of the present disclosure, an aperture created through the end face of the cap is sized to receive a fastener also extending through a through aperture created in the sound absorber material body.

In another aspect of the present disclosure, the cap includes multiple elongated slots created about the outer perimeter wall of the cap.

In another aspect of the present disclosure, the elongated slots are oriented substantially parallel to a length of the cap.

In another aspect of the present disclosure, the cap includes multiple elongated raised ribs created about the outer perimeter wall of the cap.

According to several aspects, a vehicle sound absorber system includes a sound absorber fixing fastener, including: a cap having a cylindrical bore and an end face including multiple flexible bite members; a sound absorber material body locally compressed and partially captured within the cylindrical bore of the cap; and a remainder of the sound absorber material body not captured within the cylindrical bore extends radially outward and freely away from the cap. A stud extends through a vehicle body wall and extends through a through aperture created in the sound absorber material body. The cap is captured on the stud by frictional engagement of the flexible bite members on the stud.

In another aspect of the present disclosure, a sound absorber panel of an acoustic material receiving the stud through an aperture created in the sound absorber panel, the sound absorber panel releasably attached to the vehicle body wall by contact of the end face of the cap with the sound absorber panel.

In another aspect of the present disclosure, the sound absorber panel includes a recessed area preformed proximate to a location where the stud is received and where sound absorbing material is at least partially compressed.

In another aspect of the present disclosure, the remainder of the sound absorber material body not captured within the cylindrical bore substantially fills the recessed area.

In another aspect of the present disclosure, the remainder of the sound absorber material body not captured within the cylindrical bore is received in and is positioned having an outer surface of the remainder of the sound absorber material body defining a clearance gap with respect to the recessed area.

In another aspect of the present disclosure, the sound absorber panel is locally fully compressed at the location of penetration by the stud to form a fully compressed layer which is substantially planar and oriented substantially parallel to a surface of the vehicle body wall.

In another aspect of the present disclosure, the cap includes multiple elongated members created about an outer perimeter wall of the cap to enhance frictional contact for manual installation of the cap onto the stud, and to promote axial rotation of the cap for removal of the cap from the stud.

According to several aspects, a method for releasably retaining a sound absorber panel on a vehicle body wall includes: mounting a sound absorber material panel onto a stud extending from a body wall of a vehicle; locally compressing a sound absorber material body to partially capture the sound absorber material body within a cylindrical bore of a cap of a sound absorber fixing fastener, with a remainder of the sound absorber material body not captured within the cylindrical bore extending radially outward and freely away from the cap; gripping the cap between the thumb and one or more fingers of a hand of an installer; aligning an aperture of the cap with the stud; and pushing the sound absorber fixing fastener in an installation direction until the cap fully seats against a fully compressed layer of the sound absorber material panel, having multiple bite members integrally extending from the cap elastically deflecting as the cap slides onto the stud, with an elastic biasing force generated by elastic deflection of the bite members thereafter acting to engage the bite members in frictional contact with the stud.

In another aspect of the present disclosure, the method further includes filling a recessed area of the sound absorber material panel using the remainder of the sound absorber material body not captured within the cylindrical bore.

In another aspect of the present disclosure, the method further includes positioning the sound absorber material body not captured within the cylindrical bore within a recessed area of the sound absorber material panel such that an outer surface of the remainder of the sound absorber material body defines a clearance gap with the recessed area.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
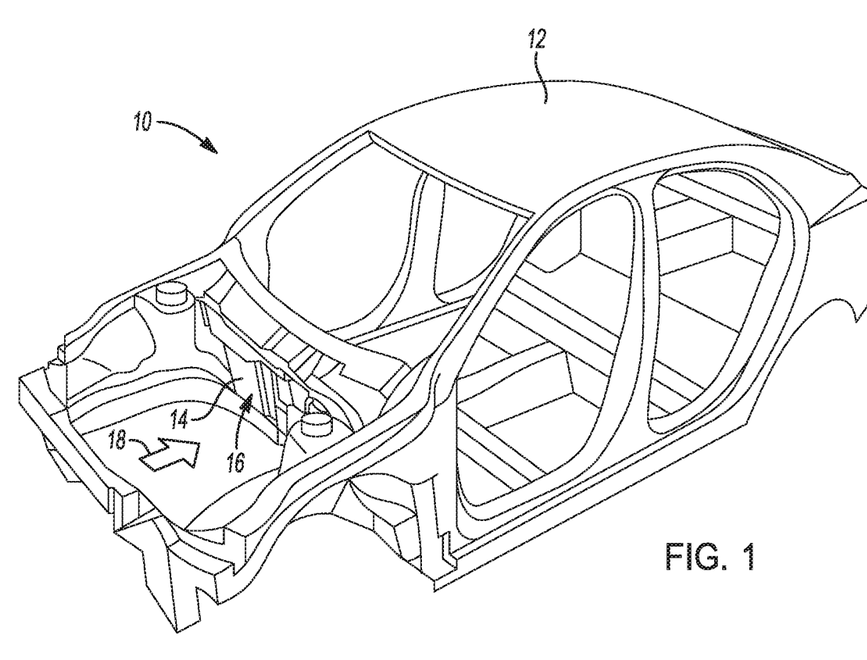
FIG. 1 is a front left perspective view of an automobile vehicle having a sound absorber panel attached using sound absorber fixing fasteners according to an exemplary embodiment.

Referring to FIG. 1, a vehicle sound absorber system 10 is provided for an automobile vehicle 12 to releasably fix a sound absorber panel 14 of an acoustic material to a vehicle structural or body wall 16 by connection of the sound absorber panel 14 using fasteners described in reference to FIGS. 3 through 6 in an installation direction 18.

Referring to FIG. 2 and again to FIG. 1, the vehicle body wall 16 may be for example a trunk wall, an inner door panel or an engine compartment wall, with multiple installation studs pre-installed on the vehicle body wall 16. The studs can include a first stud 20, a second stud 22, a third stud 24, a fourth stud 26 and a fifth stud 28. The quantity of studs is not limiting and may be more or less than five studs depending on a size and geometry of the sound absorber panel 14 to be affixed to the vehicle body wall 16. Each location of one of the studs can further include a recessed planar section 30 to provide more direct access to each of the studs when mounting the sound absorber panel 14 shown in FIG. 1.

Figure 2:
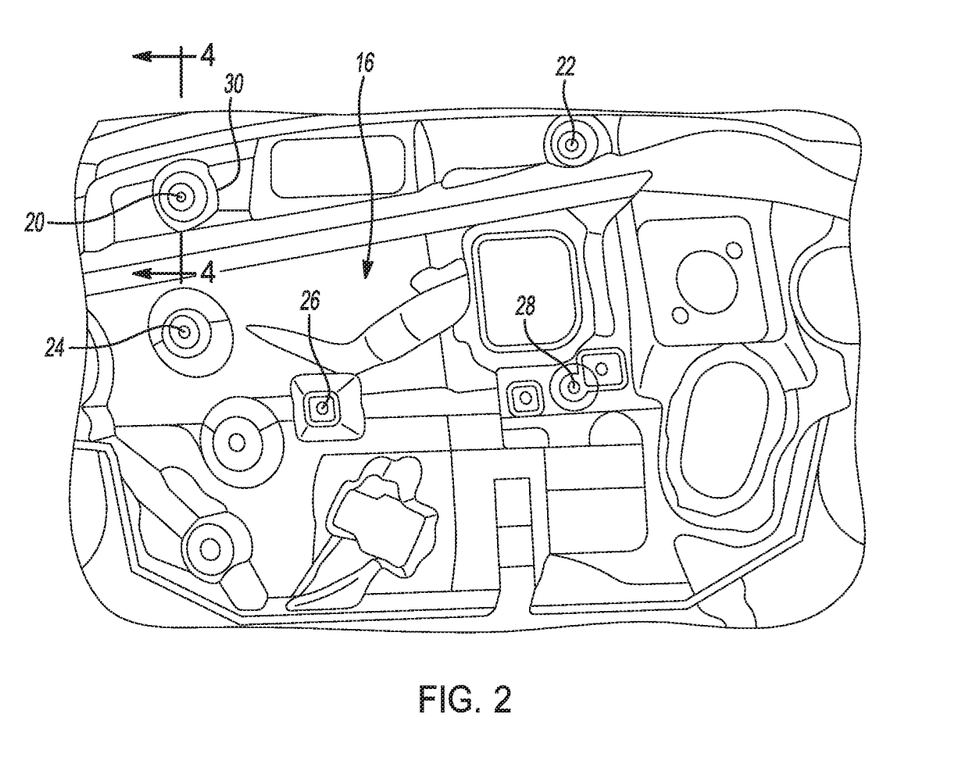
FIG. 2 is a front elevational view looking rearward of the sound absorber panel and the body panel of FIG. 1.

Referring to FIG. 3 and again to FIGS. 1 and 2, the sound absorber panel 14 is releasably fixed to each of the studs attached to the vehicle body wall 16 using a sound absorber fixing fastener 32. Each sound absorber fixing fastener 32 includes a cap 34 which includes multiple elongated members 36 such as recessed slots or raised ribs created about an outer perimeter wall 38 which are oriented substantially parallel to a length of the cap 34 and an orientation of the stud when it extends through the cap 34, such as the exemplary stud 20 shown. The elongated members 36 can also be multiple raised ribs in the same positions as the elongated members 36 defining slots. The elongated members 36 such as raised ribs or recessed slots provide for enhanced frictional grip of the cap 34 for manual installation or subsequent removal of each sound absorber fixing fastener 32. The cap 34 is generally cylindrical in shape and can be formed of a metal material which is drawn or stamped with the elongated members 36 formed in the same forming operation, or can be molded such as using an injection molding operation from a material such as a polymeric material having the elongated members 36 formed therewith. A substantially flat or planar end face 40 of the cap 34 is provided as a seating surface for directly contacting the sound absorber panel 14.

Figure 3:
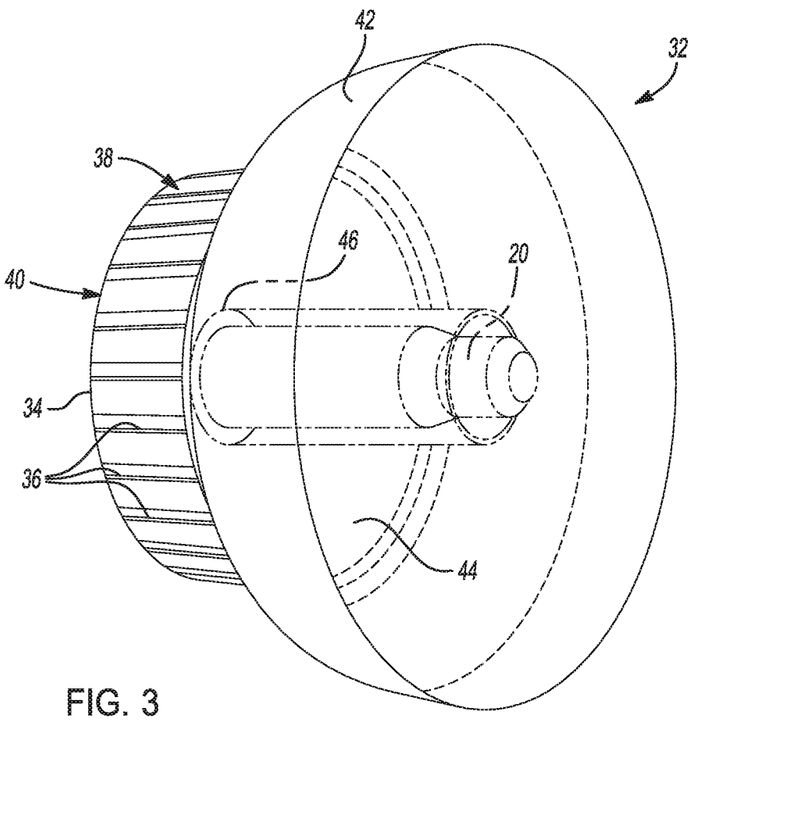
FIG. 3 is a perspective view of a sound absorber fixing fastener according to an exemplary embodiment.

A sound absorber material body 42 is locally compressed and partially captured within a cylindrical bore 44 of the cap 34. A remainder of the sound absorber material body 42 not captured within the cylindrical bore 44 extends radially outward and freely away from the cap 34. An aperture 46 is provided through the end face 40 to slidably receive the stud such as the stud 20 shown.

Referring to FIG. 4 and again to FIGS. 1 through 3, an exemplary installation of a sound absorber fixing fastener 32 is provided for a vehicle engine compartment as follows. The stud such as the exemplary stud 20 shown is preinstalled with a fastener head seated against a vehicle cabin facing surface 48 of the vehicle body wall 16 and may include a mounting flange seated against an oppositely facing engine compartment facing surface 50 of the vehicle body wall 16. The sound absorber panel 14 is shown in its installed position against the engine compartment facing surface 50. The sound absorber panel 14 includes a recessed area 52 preformed proximate to each location where a stud is received, where sound absorbing material is at least partially compressed. The sound absorber panel 14 is further locally fully compressed at the location of penetration by each stud to form a fully compressed layer 54 which is substantially planar and oriented substantially parallel to the engine compartment facing surface 50 of the vehicle body wall 16. Each fully compressed layer 54 is provided to avoid delamination of the sound absorber panel 14 proximate to each stud during installation and with the sound absorber fixing fastener 32 in an installed position. A clearance aperture 56 is pre-formed through the fully compressed layer 54 to allow through passage of each stud such as the exemplary stud 20. In the exemplary aspect, a shank 57 of the stud 20 extends through the clearance aperture 56 into an engine compartment 58 of the vehicle. It should be apparent that the engine compartment 58 can also be defined as a vehicle trunk space, an inner door space, or the like where acoustic insulation installation is desired.

Figure 4:
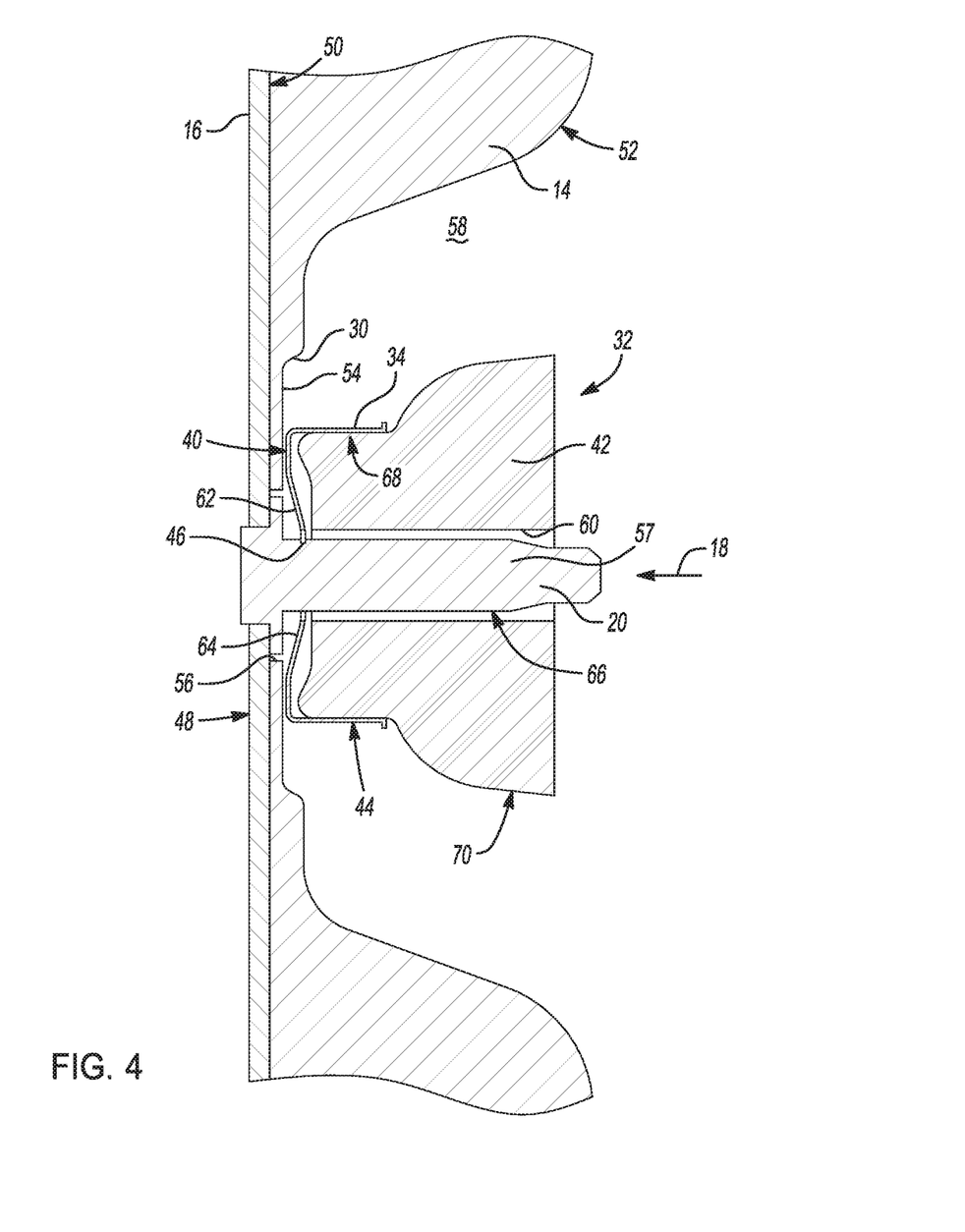
FIG. 4 is a cross sectional elevational view taken at section 4 of FIG. 2.
Figures 5, 6, 7:
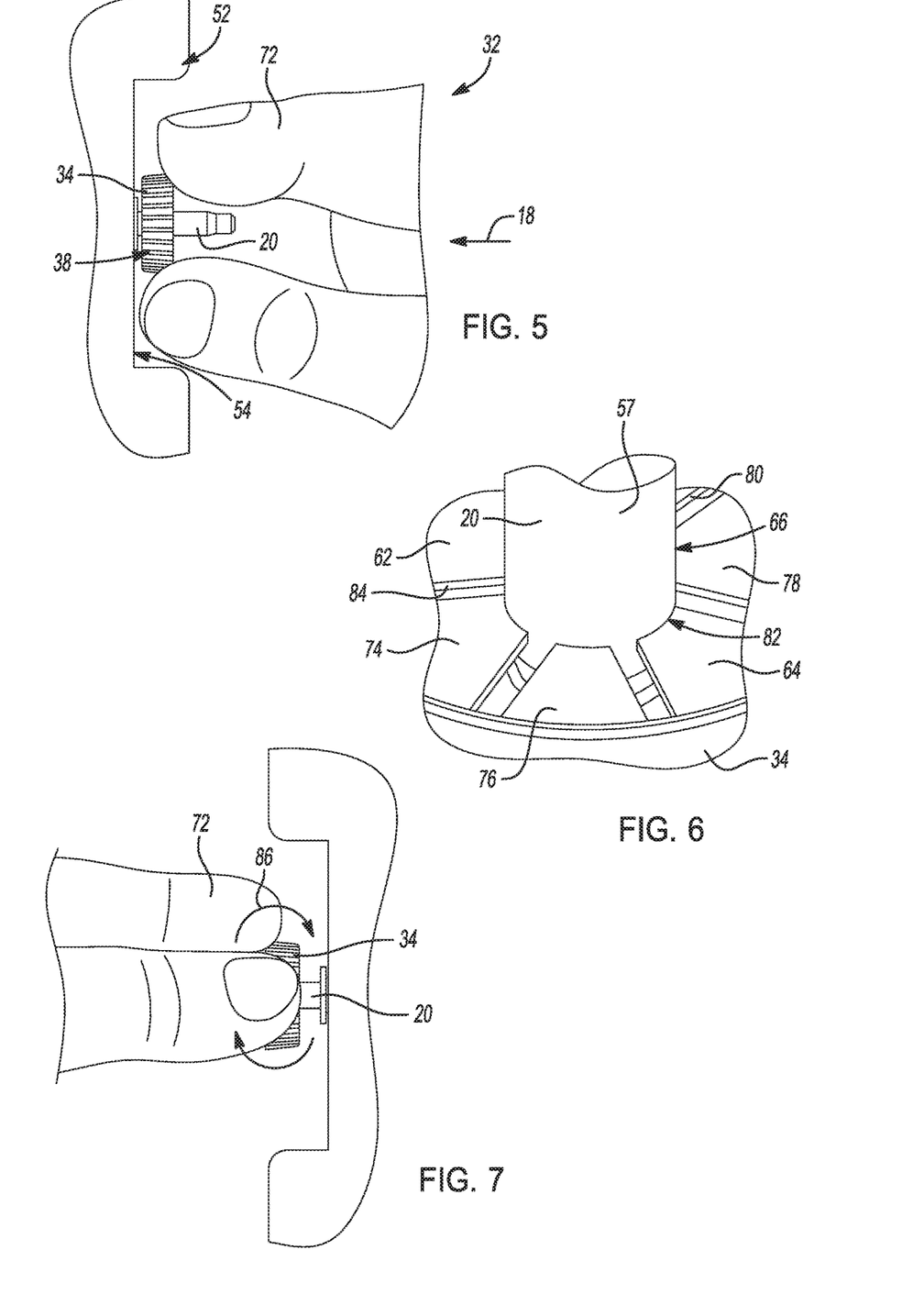
FIG. 5 is a side elevational view of an exemplary installation of the sound absorber fixing fastener of FIG. 3.
FIG. 6 is partial perspective view of an end wall of the sound absorber fixing fastener of FIG. 3.
FIG. 7 is a side elevational view of an exemplary removal of the sound absorber fixing fastener of FIG. 3.

The sound absorber fixing fastener 32 is aligned such that the stud 20 is received in a through bore 60 created in the sound absorber material body 42 as the sound absorber fixing fastener 32 is pressed onto the stud in the installation direction 18. The end face 40 of the cap 34 includes multiple flexible bite members or retainer tabs such as an opposed first bite member 62 and a second bite member 64 shown. The bite members directly frictionally engage and "bite" into an outer surface 66 of the shank 57 of the stud 20 to resist release of the sound absorber fixing fastener 32. The sound absorber fixing fastener 32 is pressed onto the stud until the end face 40 of the cap 34 abuts against the fully compressed layer 54 thereby releasably attaching both the sound absorber panel 14 and the sound absorber material body 42 to the vehicle body wall 16.

The portion of material of the sound absorber material body 42 captured within the cylindrical bore 44 of the cap 34 seats against an inner cylindrical-shaped wall 68 of the cap 34. The remaining portion of the material of the sound absorber material body 42 has an outer surface 70 which can be configured to closely match a geometry of the recessed area 52 and can therefore substantially fill the recessed area 52. In an alternative configuration a gap can be retained between the outer surface 70 and the recessed area 52 as shown. Except for the studs such as the stud 20 shown, the sound absorbing material of the sound absorber material body 42 substantially replaces the sound absorber material which is removed to form each of the recessed areas 52 and the fully compressed layers 54. A desired vehicle acoustic performance is thereby maintained.

Referring to FIG. 5 and again to FIGS. 1 through 4, during installation of an exemplary sound absorber fixing fastener 32 the outer perimeter wall 38 of the cap 34 is gripped for example between the thumb and one or more fingers of a hand 72 of an installer. No rotational motion is required during installation of the sound absorber fixing fastener 32, therefore the installer pushes the sound absorber fixing fastener 32 in the installation direction 18 until fully seated against the fully compressed layer 54. The bite members such as the first bite member 62 and a second bite member 64 elastically deflect as the cap 34 slides onto the stud 20, with an elastic biasing force generated by elastic deflection of the bite members thereafter acting to engage the bite members in frictional contact with the stud 20. The size or clearance provided by the recessed area 52 is predetermined to allow space for at least the thumb and fingers of the hand 72 of the installer during installation.

Referring to FIG. 6 and again to FIGS. 1 through 5, the first bite member 62 and second bite member 64 define individual ones of multiple bite members defining the end face 40 of the cap 34. The multiple bite members can also include a third bite member 74, a fourth bite member 76, a fifth bite member 78, and a sixth bite member 80. Each bite member can include a "propeller-shaped" angular orientation having a curved end face 82 shaped to substantially match a radius of curvature of the outer surface 66 of the shank 57 of the stud 20. A gap 84 is also provided between each two successive ones of the bite members to allow the individual bite members to individually elastically flex during installation and to individually bite against the outer surface 66.

Referring to FIG. 7 and again to FIGS. 1 through 6, sound absorber fixing fasteners 32 of the present disclosure can be removed to allow for maintenance within the engine compartment 58, or wherever a similarly installed acoustic absorber panel is provided, or for repair and replacement of the sound absorber panel 14 itself. Each sound absorber fixing fastener 32 can be gripped by the hand 72 and rotated in a counterclockwise direction of rotation 86. This rotation of the cap 34 together with the "propeller-shaped" angular orientation of the bite members and the curved end face 82 allows the cap 34 to threadably release from the outer surface 66 of the shank 57 of the stud 20.

Figure 8:
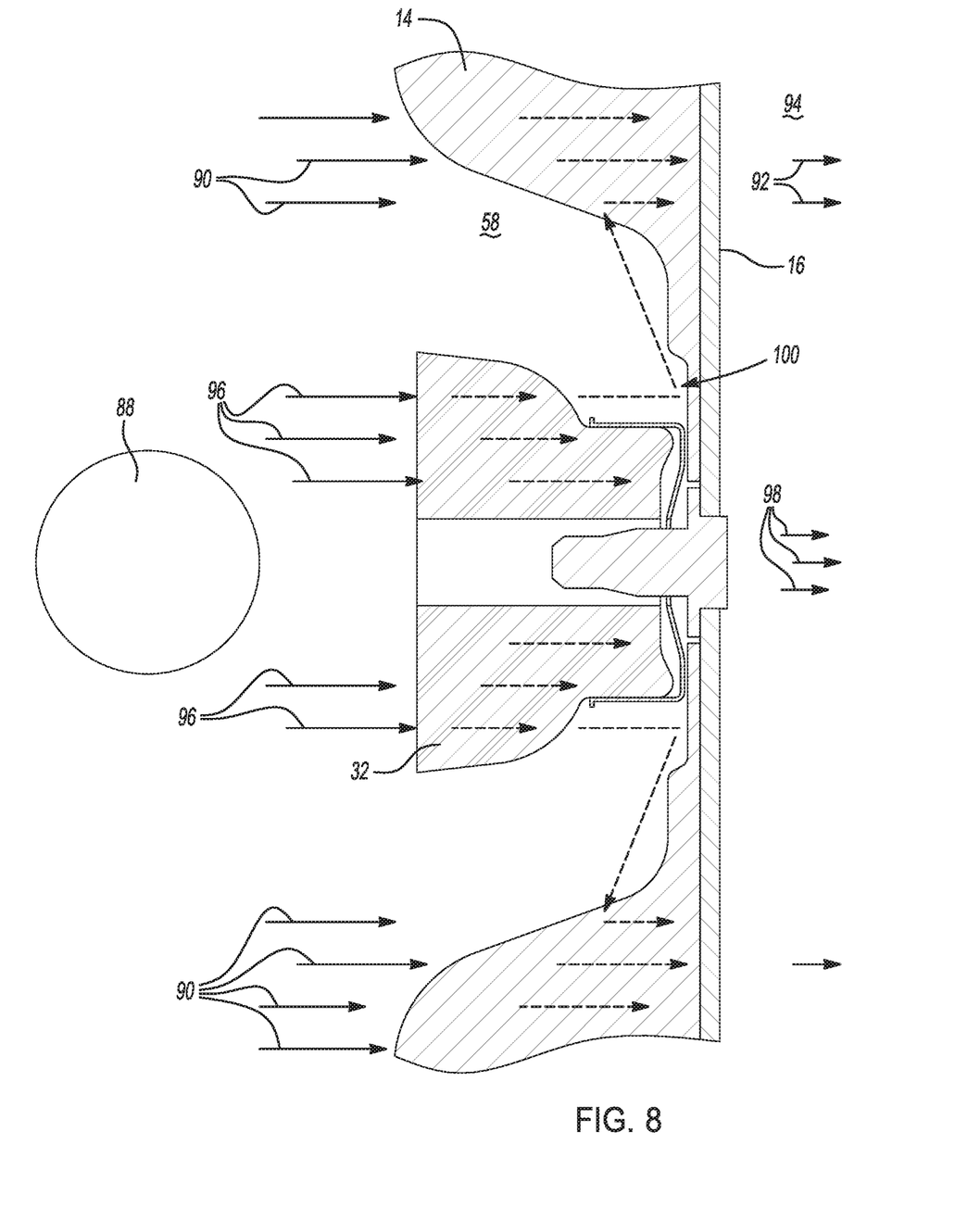
FIG. 8 is a cross sectional elevational view similar to FIG. 4.

Referring to FIG. 8 and again to FIG. 4, a sound source 88 such as a vehicle engine, one or more vehicle tires, or the like generates sound waves 90 which are normally substantially attenuated to residual sound waves 92 by the sound absorber panel 14 prior to passing through the vehicle body wall 16 into a passenger compartment 94. Each of the sound source sound absorber fixing fasteners 32 (only one shown in this view) provide additional sound absorption in the recessed areas 52 by attenuating sound waves 96 which encounter the sound source sound absorber fixing fasteners 32 to produce residual sound waves 98 in the passenger compartment 94. In addition, the curved geometry of the sound source sound absorber fixing fasteners 32 also deflects a portion 100 of the sound waves 96 impacting with each of the sound source sound absorber fixing fasteners 32 into the sound absorber panel 14 for further attenuation.

A vehicle sound absorber system 10 of the present disclosure offers several advantages. These include provision of an acoustic material absorber with the sound absorber fixing fastener 32 to recapture otherwise lost acoustic absorption capability due to the compression of an acoustic material panel needed to avoid delamination in the areas of penetration by studs used to mount the acoustic material panel. In addition, the cap design and method of attachment of the sound absorber fixing fastener 32 allows manual removal of the sound absorber fixing fastener 32 to permit removal, servicing, or replacement of the sound absorption material panel.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A sound absorber fixing fastener, comprising:
   a cap having a cylindrical-shape outer perimeter wall and a cylindrical bore;
   a sound absorber material body locally compressed and partially captured within the cylindrical bore of the cap; and
   a remainder of the sound absorber material body not captured within the cylindrical bore extends radially outward and freely away from the cap.

2. The sound absorber fixing fastener of claim 1, further including an end face of the cap defining a seating surface to directly contact a planar compressed portion of a sound absorber panel.

3. The sound absorber fixing fastener of claim 2, wherein the end face of the cap includes multiple flexible bite members.

4. The sound absorber fixing fastener of claim 3, wherein each of the bite members defines a propeller-shape.

5. The sound absorber fixing fastener of claim 3, wherein each of the bite members includes a curved end face shaped to substantially match a radius of curvature of an outer surface of a shank of a stud.

6. The sound absorber fixing fastener of claim 3, further including a gap provided between each two successive ones of the bite members allowing the individual bite members to individually elastically flex.

7. The sound absorber fixing fastener of claim 2, further including an aperture created through the end face of the cap sized to receive a fastener also extending through a through aperture created in the sound absorber material body.

8. The sound absorber fixing fastener of claim 1, wherein the cap includes multiple elongated slots created about the outer perimeter wall of the cap.

9. The sound absorber fixing fastener of claim 8, wherein the elongated slots are oriented substantially parallel to a length of the cap.

10. The sound absorber fixing fastener of claim 1, wherein the cap includes multiple elongated raised ribs created about the outer perimeter wall of the cap.

11. A vehicle sound absorber system, comprising:
   a sound absorber fixing fastener, including:
      a cap having a cylindrical shape outer perimeter wall, a cylindrical bore end face, and multiple flexible bite members;

a sound absorber material body locally compressed and partially captured within the cylindrical bore of the cap; and a remainder of the sound absorber material body not captured within the cylindrical bore extends radially outward and freely away from the cap; and a stud extending through a vehicle body wall extending through a through aperture created in the sound absorber material body, the stud extending through the cylindrical bore end face of the cap, the cap captured on the stud by frictional engagement of the flexible bite members on the stud.

12. The vehicle sound absorber system of claim 11, further including a sound absorber panel of an acoustic material receiving the stud through an aperture created in the sound absorber panel, the sound absorber panel releasably attached to the vehicle body wall by contact of the end face of the cap with the sound absorber panel.

13. The vehicle sound absorber system of claim 12, wherein the sound absorber panel includes a recessed area preformed proximate to a location where the stud penetrates the sound absorber panel and where sound absorbing material is at least partially compressed.

14. The vehicle sound absorber system of claim 13, wherein the remainder of the sound absorber material body not captured within the cylindrical bore substantially fills the recessed area.

15. The vehicle sound absorber system of claim 13, wherein the remainder of the sound absorber material body not captured within the cylindrical bore is received in and is positioned having an outer surface of the remainder of the sound absorber material body defining a clearance gap with respect to the recessed area.

16. The vehicle sound absorber system of claim 13, wherein the sound absorber panel is locally fully compressed at the location of penetration by the stud to form a fully compressed layer which is substantially planar and oriented substantially parallel to a surface of the vehicle body wall.

17. The vehicle sound absorber system of claim 11, wherein the cap includes multiple elongated members created about an outer perimeter wall of the cap to enhance frictional contact for manual installation of the cap onto the stud, and to promote axial rotation of the cap for removal of the cap from the stud.

18. A method for releasably retaining a sound absorber panel on a vehicle body wall, comprising:

mounting a sound absorber material panel onto a stud extending from a body wall of a vehicle;

locally compressing a sound absorber material body to partially capture the sound absorber material body within a cylindrical bore of a cap of a sound absorber fixing fastener, with a remainder of the sound absorber material body not captured within the cylindrical bore extending radially outward and freely away from the cap, the cap having a cylindrical-shape outer perimeter wall;

gripping the cap between a thumb and one or more fingers of a hand of an installer;

aligning an aperture of the cap with the stud; and pushing the sound absorber fixing fastener in an installation direction until the cap fully seats against a fully compressed layer of the sound absorber material panel, having multiple bite members integrally extending from the cap elastically deflecting as the cap slides onto the stud, with an elastic biasing force generated by elastic deflection of the bite members thereafter acting to engage the bite members in frictional contact with the stud.

19. The method for releasably retaining a sound absorber panel on a vehicle body wall of claim 18, further including filling a recessed area of the sound absorber material panel using the remainder of the sound absorber material body not captured within the cylindrical bore.

20. The method for releasably retaining a sound absorber panel on a vehicle body wall of claim 18, further including positioning the sound absorber material body not captured within the cylindrical bore within a recessed area of the sound absorber material panel such that an outer surface of the remainder of the sound absorber material body defines a clearance gap with the recessed area.

* * * * *